United States Patent [19]
Lansang et al.

[11] Patent Number: 6,127,798
[45] Date of Patent: Oct. 3, 2000

[54] ELECTRIC POWER SUPPLY HAVING TWO ELECTRICAL BATTERY STORAGE MEANS FOR VEHICLES AND OTHER APPLICATIONS

[76] Inventors: Enrique Lansang, 1591 Howard St., San Francisco, Calif. 94103; Felix The, 337 Coleridge St., San Francisco, Calif. 94110

[21] Appl. No.: 09/059,983

[22] Filed: Apr. 14, 1998

[51] Int. Cl.$^7$ .......................................................... H02J 7/00
[52] U.S. Cl. ................................................................ 320/104
[58] Field of Search ..................................... 320/104, 116, 320/117, 118, FOR 162, DIG. 34; 180/65.3, 65.2, 65.4; 322/9, 16; 290/1 R, 1 C, 47, 48

[56] References Cited

U.S. PATENT DOCUMENTS

| 3,962,621 | 6/1976 | Raver ..................................... 322/28 X |
| 4,002,218 | 1/1977 | Horvat ................................. 180/65 DD |
| 4,043,293 | 8/1977 | Ruckdeschel ............................... 118/7 |
| 4,516,066 | 5/1985 | Nowakowski ........................ 322/26 X |
| 5,549,984 | 8/1996 | Dougherty ................................ 429/61 |
| 5,666,006 | 9/1997 | Townsley et al. ......................... 307/66 |

*Primary Examiner*—Edward H. Tso

[57] ABSTRACT

An electric power supply apparatus including at least first and second electric battery storage means for operating energy. The electric power supply apparatus further includes in situ electric charging means and switching means for selectively recharging one of the first and second battery storage means while the other battery storage means is connected to an electrical load.

9 Claims, 3 Drawing Sheets

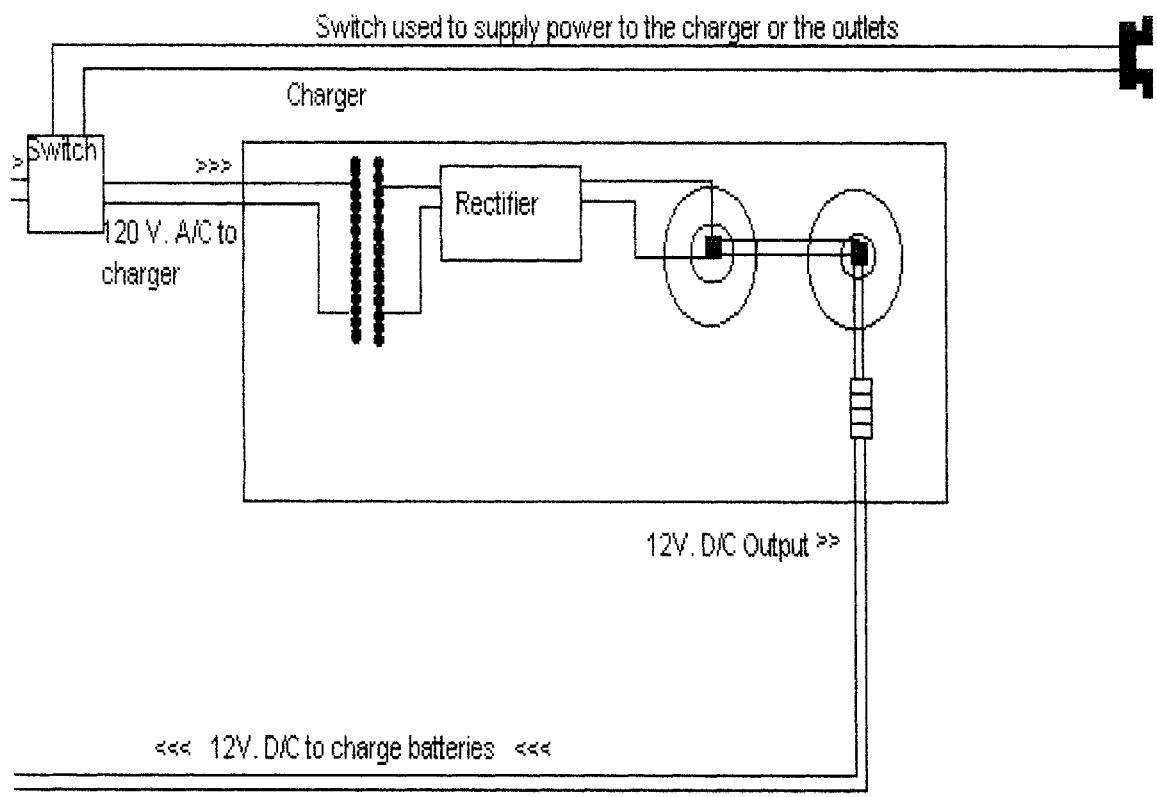
Cont. FIG. 1

ELECTRIC POWER SUPPLY HAVING TWO ELECTRICAL BATTERY STORAGE MEANS FOR VEHICLES AND OTHER APPLICATIONS

BACKGROUND OF THE INVENTION

1. Field of the Invention

The invention relates in general to electric power supplies and in particular to electric power supplies having two electrical battery storage means and an electrical generating means and switching means for independently charging and discharging each electrical battery storage means.

2. Description of the Related Art

Electric vehicles and other power supplies are dependent upon an electric battery storage means for operating energy. Generally, these consist of a 'string' of storage batteries connected in series to achieve a suitable output operating voltage. In order to store a suitable amount of operating energy, the strings of series connected batteries are connected in parallel with one another to form a 'battery pack' electric battery storage means. The batteries are interconnected by electric cables or rigid bus bars and are charged by flowing a charging current into the parallel connected strings from a suitable battery charger. The batteries are discharged by connecting the parallel strings to an electrical load such as a motor of the electric vehicle.

The battery packs described work well for their purpose, but they do have one inherent limitation. The commercially availabe battery packs do not have the electrical storage capacity to deliver an extended range for the electric vehicle. The related art has responded to this limitation by proposing 'hybrid' vehicles that include an electrical generator powered by an internal combustion engine to recharge the battery pack during operation to increase the vehicle range. This solution is not favored by the motoring public or enviromentalist or the government, because the electric vehicle was proposed to replace the internal combustion engine driven vehicle.

Accordingly it would be desirable to have a means and method for extending the range of an electrical vehicle by in situ recharging the electrical storage capacity of commercially available battery packs while the vehicle is operating and without the use of an internal combustion engine driven generator. Such means and methods for in situ recharging the electrical storage capacity of commercially available battery packs should and would be just as applicable to portable power supplies for use in remote and emergency applications.

A search of the relevent art identified the following related references:

U.S. Pat. No. 3,962,621 is directed to a duel battery charging Generator system. The generator has two bridge rectifiers disposed within the frame of the generator. Each of these rectifiers is isolated from the other so that they may each charge a separate battery at the same time.

U.S. Pat. No. 4,043,293 is similar to '621 above in that both patents teach series connected batteries to obtain high voltage for starting. Both patents teach simultaneous charging of both batteries.

U.S. Pat. No. 4,516,066 disclosed another system for charging duel batteries.

U.S. Pat. No. 5,549,984 teaches a switching circuit for a primary/secondary battery system.

U.S. Pat. No. 5,666,006 is directed to a battery monitor and control system for preventing over charging and undercharging each battery in a string of batteries.

A thorough review of the above references reveals that none of the references teaches the methods and apparatus of the present invention of charging one battery pack while simultaneously discharging another battery pack in order to extend the total energy derived from the system.

SUMMARY OF THE INVENTION

Briefly, the present invention is a portable electric power supply apparatus including at least first and second electric battery storage means for operating energy. The apparatus further includes in situ electric charging means and switching means for selectively recharging one of the first and second battery storage means while the other other battery storage means is connected to an electrical load. When the battery storage means that is connected to the electrical load is depleted the switching means includes means for reversing the connections upon which the first and second electric battery storage means are reverse connected so that the depleted battery storage means is recharged while the recharged battery storage means is now connected to both the electrical load and the input to the in situ electric charging means to provide for recharging the depleted electric battery storage means during the operation of supplying electric power to the electric load. In this manner the electric power supply apparatus of the present invention charges one battery pack by means of an in situ electric charging means while simultaneously discharging another battery pack to power both the insitu electric charging means and an electric load such as a vehicle electric motor or a remote or emergency electrical apparatus all to provide for extending the total power derived from the portable electric power supply system.

BRIEF DESCRIPTION OF THE DRAWINGS

The invention may be understood and further advantages and uses thereof more readily apparent, when considered in view of the following detailed description of the exemplary embodiments, taken with the accompanying drawings, in which.

DESCRIPTION OF THE PREFERRED EMBODIMENTS

Figure 1:
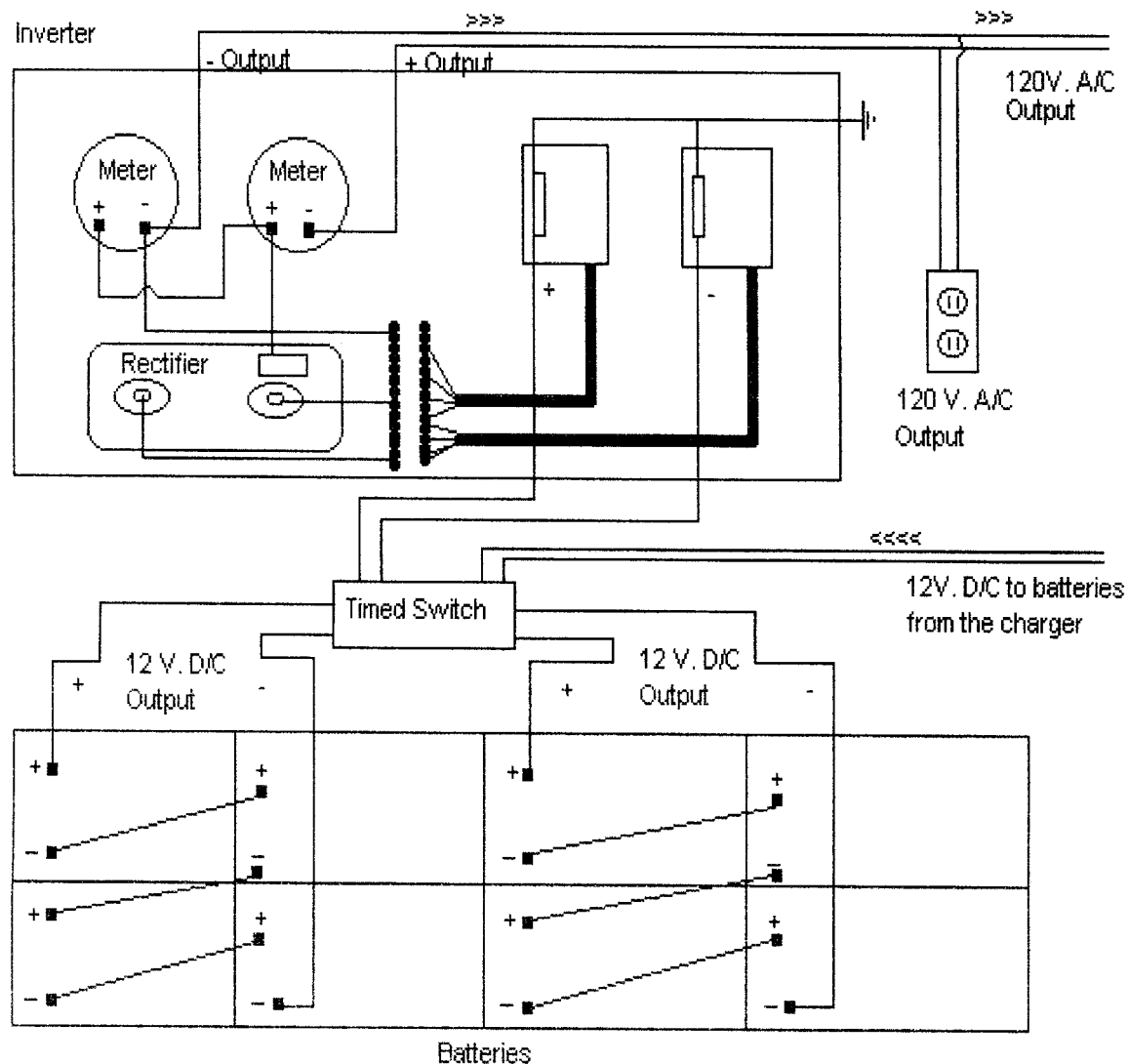
FIG. 1 is a schematic view of a portable electric power supply constructed according to the teachings of the invention.

Referring now to the drawings, and to FIG. 1 in particular, there is shown a schematic view of an electric power supply 10 constructed according to the teachings of the invention. Electric power supply 10 includes first and second battery packs 12 and 14 respectively. Each of first and second battery packs includes a 'string' of storage batteries connected in series to achieve a suitable output operating voltage. In order to store a suitable amount of operating energy, the strings of series connected batteries are connected in parallel with one another to form each of the first and second battery packs 12 and 14 respectively.

Referring again now to FIG. 1, the output of each of first and second battery packs 12 and 14 is fed into (connected to) switching means 16, which may be for instance time or voltage responsive as will be described more fully infra. The switched output from switching means 16 is connected to Inverter means 18 which may be for instance an Interphase Invertor or any suitable equivalent which is commercially available and which converts the DC output from each of the first and second battery packs into a suitable AC voltage such as for instance 120 volts AC, so that the stored energy in each of first and second battery packs 12 and 14 respectively may be converted into a useful power form for operating electric loads such as for instance electric lights, appliances and power tools. The output from inverter means 18 is connected to first and second 120 volt outlets 22 and 24 and charging means 26 which may be the commercially available unit manufactured by Associated® or any suitable equivalent for converting an AC current input into a suitable DC voltage current for recharging first and second battery packs 12 and 14 respectively. First and second outlets 22 and 24 respectively and charging means 26 are all connected in parallel. The output 28 of charging means 26 which may be 12 volts DC is connected to switching means 16 to complete the passive (no moving parts) of electric power supply 10.

In order to increase the output power from electric power supply 10, 120 volt outlet 22 is connected to 120 volt plug or inlet 32 which feeds into computer speed controller 34 which may be for instance the one manufactured by A. C. Tech® or any commercially available equivalent for converting a 120 volt AC input into a suitable frequency and voltage for operating an electric motor. The output of computer speed controller 34 is connected to a suitable motor generator set which may be electric motor 42 and generator 44 as shown as individual components physically connected by belt 46 but may be connected by a gear drive assembly or mounted on the same shaft as are well known in the art and are even commercially available. The switched output 48 of motor generator set 38 may be used as an outlet for an electric load such as outlet 24 or may be connected to the input of charging means 26.

When electric power supply 10, constructed according to the teachings of the invention, was operated the unexpected result of extended battery pack life for first and second battery packs 12 and 14 respectively was experienced. This was an unexpected result because the laws of physics require that every component to a system such as electric power supply 10 will have an efficiency less than 100%, that is some losses will occur within every component. And this does occur with each component of electric power supply 10. But the unexpected result of extended battery life did indeed occur. It is not understood why this result of extended battery life occurs. It is thought it may be battery temperature related. By recharging one battery pack while simultaneously discharging a separate battery pack according to the teachings of the invention, each battery pack only experiences a portion of the total energy demand of the system at any given time and the result is an extended battery life/power output of the entire electric power supply 10.

Figure 2:
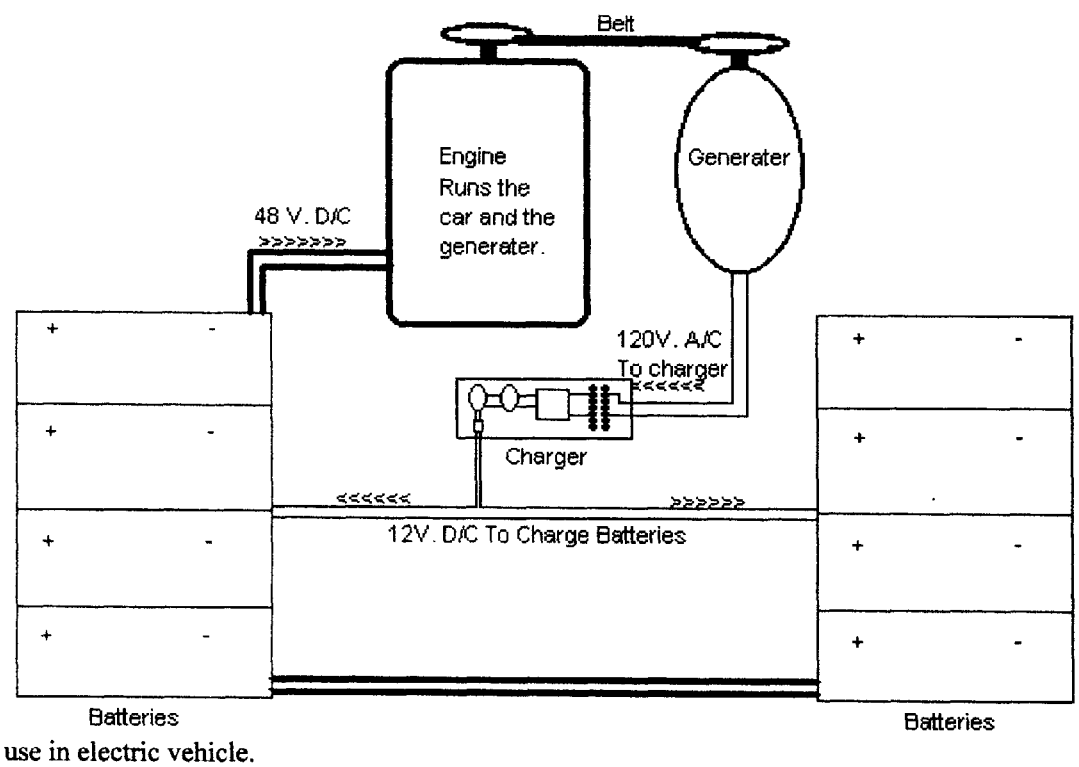
FIG. 2 is a schematic view of an electric vehicle system powered by the portable electric power supply of the invention.

Referring again now to the drawings and to FIG. 2 in particular, there is shown a schematic view of an electric vehicle power system powered by the portable electric power supply of the invention. Vehicle power system 10 includes first and second battery packs 12 and 14, switching means 16, electric motor 18, cooling fan 22, electric generator 24, battery chargers 26 and 36 and conduit system 28 for interconnecting the system components as shown in FIG. 2. Each of first and second battery packs 12, 14, respectively are connected in series as is common in the art so as to achieve 48 volts, but indeed the vehicle power system 10 will operate on any suitable voltage. A common operating voltage for motor vehicles is 96 volts. The invention is believed to be operable at 96 volts and all the teachings of the invention will apply to a 96 volt operating range as well as any other suitable voltage operating range. The electric motor 18 is a 48 volt DC model manufactured by General Electric® and is a standard electric motor for an electric vehicle application. Cooling fan 22 is a three speed electric fan manufactured by Fiat Motor Car Co.®. Electric Generator 24 is a 4,500 watt output manufactured by Fab Co.® and has a 120 volt AC output Electric generator 24 output is connected by conduit system 28 to the input of battery charger 26, which is manufactured by Sebring Co.® and which converts the 120 Volt AC output of electric generator 24 into 48 volts DC so as to be suitable for recharging first and second battery packs 12 and 14 respectively.

Electric generator 24 output is also connected to battery charger 36 which is manufactured by Solar Corp.® and its 12 volt output is connected to 12 volt accessory battery 42, which battery 42 powers cooling fan 22 and all the vehicle accessories as shown in general at 44. Vehicle accessories may include but are not limited to lights, radio, windshield wipers and other vehicle power accessories.

Please note that since the output of electric generator 24 is 110 volts AC., suitable AC. outlets 46, 48 may be connected directly to generator 24. In this manner, then vehicle power system 10 may be used to power household or emergency appliances and will therefore be usable as an portable power generator. In such an operation differential 10 would have to be operated in a neutral mode, that is disconnected from the vehicle drive train (not shown), or the vehicle drive wheel(s) may be lifted off the ground.

In operation, switching means 16 connects one of first and second battery packs 12 and 14 to electric motor 18 to power the vehicle in one the known methods of the art, which in this application is by direct coupling to the rear differential 36. The electric generator 24 is direct coupled to electric motor 18 by means of drive belt 32, but may also be coupled to any drive means of the vehicle (not shown). The output of electric generator 24 is connected to battery charger 26 in order to recharge the other battery pack 12,14 than is used for powering the electric motor. In this manner, vehicle power system 10 is at all times discharging one of the battery packs 12, 14 and is recharging the other battery pack 12 or 14 respectively. Although principles of physics teach the every component of a power system has an efficiency less than 100%, and one would expect that power system 10 would discharge faster than a comparable system without the additional burden of electric generator 24 and battery charger 26, an unexpected result occurred when power system 10 was operated. The power system had greater range and extended battery life than would have been expected. The range extension was documented by a driving test and was found to be almost twice that measured with one battery pack of similar storage capacity. The range extension is also due to the positive generator recharging whichever battery pack to which it is connected whenever the vehicle coast on the level or proceeds downhill. This is because the generator is constantly in mechanical rotational communication with the drive line of the vehicle.

It is thought that the unexpected extended battery life and vehicle range that occurred with power system 10 according to the teachings of the invention, occurred because each of the battery packs operated at a lower temperature range than would have occurred if both the charging function and the discharging function occurred simultaneously at the same battery pack. This theory is reinforced by the high operating temperatures experienced in operating the vehicle by power system 10. In order to regulate these operating temperatures a three speed cooling fan 22 which may for instance be a standard exhaust fan was installed on the vehicle and successfully reduced the operating temperatures. The exhaust from fan 22 may be directed into the vehicle passenger compartment by a suitable convection conduit as shown in general at conduit 38.

I claim:

1. A vehicle electric power propulsion system, comprising:
   a.) an electric motor suitable for propelling said vehicle;
   b.) an electric generator disposed in rotational conductivity with said electric motor;
   c.) first and second battery storage means for providing electric energy to said electric motor and accepting electrical recharge from said electric generator; and
   d,) switching means for selectively connecting each of said electric motor and said electric generator with each of said first and second battery storage means to provide for discharging one of said first and second battery storage means to said electric motor while recharging the other of said first and second battery storage means by said electric generator to provide for selective positive generator recharging one of said first and second battery storage means whenever said electric motor rotates and whenever said vehicle moves.

2. The vehicle electric power propulsion system of claim 1, further including an electric exhaust fan means disposed in fluid conductivity with each of the elements of the vehicle electric power propulsion system of claim 1 for exhausting heated air from the vicinity of the elements of the vehicle electric power propulsion system to provide a suitable operating temperature for the elements of the vehicle electric power propulsion system.

3. The vehicle electric power propulsion system of claim 2, further including a charging means disposed electrically between the electric generator and said switching means.

4. The vehicle electric power propulsion system of claim 3, further including power outlets disposed in electrical connection with said electric generator to provide output electrical power to emergency and remote appliances.

5. The vehicle electric power propulsion system of claim 4, further including a third battery storage means in electrical coupling with the electric generator for supplying power to the vehicle exhaust fan means and accessories.

6. The vehicle electric power propulsion system of claim 5 further including a second charging means disposed between said generator and said third battery storage means.

7. A vehicle electric power propulsion system, comprising:
   a.) an electric motor suitable for propelling said vehicle;
   b.) first and second battery storage means for providing electric energy to said electric motor;
   c.) switching means for selectively connecting said electric motor with each of said first and second battery storage means to provide for discharging one of said first and second battery storage means to said electric motor at a time; and
   d.) electric exhaust fan means disposed in fluid conductivity with each of the elements of the vehicle electric power propulsion system for exhausting heated air from the vicinity of the elements of the vehicle electric power propulsion system to provide a suitable operating temperature for the elements of the vehicle's electric power propulsion system.

8. The vehicle electric power propulsion system of claim 7, further including a third battery storage means for supplying power to the vehicle exhaust fan means and accessories.

9. The vehicle electric power propulsion system of claim 8 further including a second charging means disposed between said generator and said third battery storage means.

* * * * *